US009251961B2

(12) United States Patent
Merker et al.

(10) Patent No.: US 9,251,961 B2
(45) Date of Patent: Feb. 2, 2016

(54) METHODS FOR PRODUCING ELECTROLYTIC CAPACITORS HAVING A POLYMERIC INTERMEDIATE LAYER, CAPACITORS PRODUCED THEREBY AND USES THEREOF

(75) Inventors: Udo Merker, Köln (DE); Klaus Wussow, Netphen (DE)

(73) Assignee: Heraeus Precious Metals GmbH & Co. KG (DE)

( * ) Notice: Subject to any disclaimer, the term of this patent is extended or adjusted under 35 U.S.C. 154(b) by 524 days.

(21) Appl. No.: 12/682,135

(22) PCT Filed: Sep. 4, 2008

(86) PCT No.: PCT/EP2008/061650
§ 371 (c)(1),
(2), (4) Date: Sep. 24, 2010

(87) PCT Pub. No.: WO2009/047059
PCT Pub. Date: Apr. 16, 2009

(65) Prior Publication Data
US 2011/0019339 A1    Jan. 27, 2011

(30) Foreign Application Priority Data
Oct. 8, 2007   (DE) .......................... 10 2007 048 212

(51) Int. Cl.
*H01G 9/15*    (2006.01)
*B05D 5/12*    (2006.01)
*H01G 9/025*   (2006.01)
(Continued)

(52) U.S. Cl.
CPC ............... *H01G 9/15* (2013.01); *H01G 9/025* (2013.01); *H01G 11/48* (2013.01); *H01G 11/56* (2013.01); *Y02E 60/13* (2013.01)

(58) Field of Classification Search
CPC .................................... H01G 9/15; B05D 5/12
USPC .............................................. 361/523; 427/80
See application file for complete search history.

(56) References Cited

U.S. PATENT DOCUMENTS

| 4,910,645 A | 3/1990 | Jonas et al. |
| 5,300,575 A | 4/1994 | Jonas et al. |

(Continued)

FOREIGN PATENT DOCUMENTS

| DE | 19627071 A1 | 1/1998 |
| EP | 0340512 A2 | 11/1989 |

(Continued)

OTHER PUBLICATIONS

Muller, H.G., Automated determination of particle-size distributions of dispersions by analytical ultracentrifugation, Colloid & Polymer Science, 1989, vol. 267, pp. 1113-1116.

(Continued)

*Primary Examiner* — Jenny L Wagner
*Assistant Examiner* — Michael P McFadden
(74) *Attorney, Agent, or Firm* — Drinker Biddle & Reath LLP (57) ABSTRACT

The invention relates to a method for producing electrolytic capacitors with low equivalent series resistance and low residual current, consisting of a solid electrolyte and an intermediate layer and an outer layer comprising conductive polymers, to electrolytic capacitors produced using this method and also to the use of electrolytic capacitors of this type.

15 Claims, 2 Drawing Sheets

(51) Int. Cl.
*H01G 11/48* (2013.01)
*H01G 11/56* (2013.01)

(56) References Cited

U.S. PATENT DOCUMENTS

| | | | |
|---|---|---|---|
| 5,461,537 A * | 10/1995 | Kobayashi et al. | 361/525 |
| 5,473,503 A * | 12/1995 | Sakata et al. | 361/525 |
| 5,586,000 A * | 12/1996 | Sakata et al. | 361/525 |
| 5,586,001 A * | 12/1996 | Amano et al. | 361/525 |
| 5,972,052 A * | 10/1999 | Kobayashi et al. | 29/25.03 |
| 6,086,642 A * | 7/2000 | Fukaumi et al. | 29/25.03 |
| 6,229,689 B1 * | 5/2001 | Kobayashi et al. | 361/525 |
| 6,361,572 B1 * | 3/2002 | Igaki et al. | 29/25.03 |
| 6,375,688 B1 * | 4/2002 | Akami et al. | 29/25.03 |
| 6,376,105 B1 | 4/2002 | Jonas et al. | |
| 6,409,777 B2 * | 6/2002 | Kobatake et al. | 29/25.03 |
| 6,430,033 B1 * | 8/2002 | Mitsui et al. | 361/523 |
| 6,462,936 B1 * | 10/2002 | Fujimoto et al. | 361/525 |
| 6,473,293 B2 * | 10/2002 | Shimada et al. | 361/523 |
| 6,515,847 B1 * | 2/2003 | Naraya | 361/523 |
| 6,580,601 B2 * | 6/2003 | Hamada et al. | 361/523 |
| 6,671,168 B2 | 12/2003 | Yoshida et al. | |
| 6,882,522 B2 * | 4/2005 | Naito et al. | 361/523 |
| 7,377,947 B2 | 5/2008 | Merker et al. | |
| 7,411,779 B2 | 8/2008 | Merker et al. | |
| 7,563,290 B2 | 7/2009 | Qiu et al. | |
| 8,313,538 B2 | 11/2012 | Merker et al. | |
| 2001/0003501 A1 * | 6/2001 | Hayashi et al. | 361/523 |
| 2001/0010617 A1 * | 8/2001 | Miyazaki et al. | 361/321.2 |
| 2002/0077450 A1 * | 6/2002 | Kirchmeyer et al. | 528/373 |
| 2003/0081374 A1 * | 5/2003 | Takada | 361/523 |
| 2003/0133256 A1 * | 7/2003 | Yoshida | H01G 9/0036 361/523 |
| 2003/0147202 A1 * | 8/2003 | Kudoh et al. | 361/523 |
| 2004/0010115 A1 | 1/2004 | Sotzing | |
| 2004/0074779 A1 | 4/2004 | Sotzing | |
| 2004/0212951 A1 * | 10/2004 | Monden et al. | 361/523 |
| 2005/0013094 A1 * | 1/2005 | Reuter et al. | 361/525 |
| 2005/0111165 A1 * | 5/2005 | Merker et al. | 361/525 |
| 2005/0212094 A1 * | 9/2005 | Takagi et al. | 257/642 |
| 2005/0231892 A1 * | 10/2005 | Harvey | 361/502 |
| 2005/0231893 A1 * | 10/2005 | Harvey | 361/502 |
| 2005/0248910 A1 * | 11/2005 | Merker | 361/525 |
| 2006/0037690 A1 * | 2/2006 | Ishiyama et al. | 156/89.11 |
| 2006/0071200 A1 * | 4/2006 | Nordquist et al. | 252/500 |
| 2006/0221549 A1 * | 10/2006 | Iida et al. | 361/313 |
| 2006/0236531 A1 * | 10/2006 | Merker | H01G 9/0032 29/746 |
| 2007/0064376 A1 * | 3/2007 | Merker et al. | 361/528 |
| 2007/0171597 A1 * | 7/2007 | Merker et al. | 361/523 |
| 2007/0177332 A1 * | 8/2007 | Kobayashi et al. | 361/502 |
| 2007/0230092 A1 * | 10/2007 | Bruner et al. | 361/523 |
| 2007/0267747 A1 * | 11/2007 | Wessling | 257/746 |
| 2008/0002334 A1 * | 1/2008 | Kakuma et al. | 361/511 |
| 2008/0005878 A1 | 1/2008 | Merker et al. | |
| 2008/0010797 A1 | 1/2008 | Qiu et al. | |
| 2008/0017833 A1 * | 1/2008 | Louwet et al. | 252/500 |
| 2008/0182115 A1 * | 7/2008 | Briney et al. | 428/473.5 |
| 2008/0192407 A1 * | 8/2008 | Lu et al. | 361/502 |
| 2008/0218942 A1 * | 9/2008 | Yamagishi et al. | 361/525 |
| 2008/0232033 A1 * | 9/2008 | Biler | 361/523 |
| 2008/0232035 A1 * | 9/2008 | Biler | 361/525 |
| 2008/0232037 A1 * | 9/2008 | Biler | 361/529 |
| 2008/0247121 A1 | 10/2008 | Qiu et al. | |
| 2008/0316680 A1 * | 12/2008 | Iida et al. | 361/523 |
| 2009/0021894 A1 * | 1/2009 | Ning et al. | 361/527 |
| 2009/0225496 A1 * | 9/2009 | Toia et al. | 361/503 |

FOREIGN PATENT DOCUMENTS

| | | |
|---|---|---|
| EP | 0440957 A2 | 8/1991 |
| EP | 1096519 A1 | 5/2001 |
| EP | 1713103 A1 | 10/2006 |
| EP | 1746613 A1 | 1/2007 |
| JP | 2003-188052 A | 7/2003 |
| JP | 2003-229330 A | 8/2003 |
| JP | 2006-295184 A | 10/2006 |
| JP | 2009-508342 A | 2/2009 |
| WO | WO-2007/031206 A1 | 3/2007 |

OTHER PUBLICATIONS

Houben Weyl, Methoden der Organischen Chemie, Bd. E 20 Makromolekulare Stoffe, Teil 2, 1987, S. 1141-1143.

Groenendaal, L., et al., "Poly(3,4-ethylenedioxythiophene) and its derivatives: past, present, and future," Advanced Materials, 2000, vol. 12, No. 7, pp. 481-494.

Blanchard, P., et al., "Thieno[3,4-b]-1,4-oxathiane: an unsymmetrical sulfure analogue of 3,4-ethylenedioxythiophene (edot) as a building block for linear π-conjugated systems," Organic Letters, 2002, vol. 4, No. 4, pp. 607-609.

* cited by examiner

Fig. 1

Fig. 2

METHODS FOR PRODUCING ELECTROLYTIC CAPACITORS HAVING A POLYMERIC INTERMEDIATE LAYER, CAPACITORS PRODUCED THEREBY AND USES THEREOF

CROSS-REFERENCE TO RELATED APPLICATIONS

This application is a national stage application, under 35 U.S.C. §371, of International Application No. PCT/EP2008/061650, filed Sep. 4, 2008, which designated the U.S. and claimed priority of German Patent Application 102007048212.6, filed Oct. 8, 2007.

BACKGROUND OF THE INVENTION

A conventional commercial solid electrolytic capacitor generally consists of a porous metal electrode, an oxide layer located on the metal surface, an electrically conductive solid which is introduced into the porous structure, an outer electrode (contacting), such as for example a silver layer or a cathode foil, and also further electrical contacts and an encapsulation.

Examples of solid electrolytic capacitors are tantalum, aluminium, niobium and niobium oxide capacitors with charge transfer complexes, brownstone or polymer solid electrolytes. The use of porous bodies has the advantage that it is possible to achieve, owing to the large surface area, a very high capacitance density, i.e. a high electrical capacitance in a small space.

The high electrical conductivity of π-conjugated polymers makes them particularly suitable as solid electrolytes. π-Conjugated polymers are also referred to as conductive polymers or as synthetic metals. They are becoming increasingly economically important, as polymers have advantages over metals with respect to processability, weight and the targeted setting of properties by chemical modification. Examples of known π-conjugated polymers are polypyrroles, polythiophenes, polyanilines, polyacetylenes, polyphenylenes and poly(p-phenylenevinylenes), poly-3,4-(ethylene-1,2-dioxy)thiophene, often also referred to as poly(3,4-ethylene-dioxy-thiophene), being a particularly important and industrially used polythiophene, as it has in its oxidised form very high conductivity and high thermal stability.

Technical developments in electronics are increasingly calling for solid electrolytic capacitors with very low Equivalent Series Resistances (ESRs). The reason for this is for example falling logic voltages, higher integration density and rising clock frequencies in integrated circuits. Furthermore, a low ESR also reduces the amount of energy consumed; this is particularly advantageous for mobile, battery-operated applications. It is therefore desirable to reduce the ESR of solid electrolytic capacitors as much as possible.

European patent specification EP-A-340 512 describes the production of a solid electrolyte from 3,4-ethylene-1,2-dioxythiophene and the use of its catatonic polymer produced by oxidative polymerisation as a solid electrolyte in electrolytic capacitors. Poly(3,4-ethylenedioxythiophene), as a substitute for manganese dioxide or for charge transfer complexes in solid electrolytic capacitors, reduces, on account of the higher electrical conductivity, the equivalent series resistance of the capacitor and improves the frequency response.

In addition to a low ESR, modern solid electrolytic capacitors also demand a low residual current and good stability in relation to external loads. In particular during the production process, high mechanical loads, which can greatly increase the residual current of the capacitor anode, occur during the encapsulation of the capacitor anodes.

Stability in relation to loads of this type, and thus a low residual current, may be achieved above all by an approx. 5-50 μm-thick outer layer made of conductive polymers on the capacitor anode. A layer of this type serves as a mechanical buffer between the capacitor anode and the cathode-side contacting. This prevents the silver layer (contacting), for example, from entering during mechanical loading into direct contact with or damaging the dielectric and the residual current of the capacitor from increasing as a result. The conductive polymeric outer layer itself should display what is known as self-healing behaviour: Relatively minor defects in the dielectric at the outer anode surface, which occur despite the buffer effect, are electrically isolated as a result of the fact that the conductivity of the outer layer is destroyed at the site of the defect by the electrical current.

Forming a thick polymeric outer layer by means of in-situ polymerisation is very difficult. The layer formation requires in this case very many coating cycles. The large number of coating cycles makes the outer layer very inhomogeneous; the rims of the capacitor anode, in particular, are often inadequately covered. Japanese patent application JP-A 2003-188052 describes that homogeneous rim coverage requires costly adaptation of the process parameters. However, this makes the production processes very susceptible to malfunctions. In addition, it is generally necessary to remove residual salts from the layer, which is polymerised in situ, by washing; as a result, holes faun in the polymer layer.

A dense electrically conductive outer layer with good rim coverage can be achieved by electrochemical polymerisation. However, electrochemical polymerisation requires a conductive film first to be deposited on the insulating oxide layer of the capacitor anode and this layer then to be electrically contacted for each individual capacitor. This contacting is very costly in large-scale production and can damage the oxide layer.

In European patent applications EP-A-1713103 and EP-A-1746613, a polymeric outer layer is generated by applying a dispersion comprising particles of a conductive polymer and a binder. Polymeric outer layers can be generated relatively easily using these methods. However, this method has the drawback that the ESR rises markedly under a thermal load, such as is produced for example during soldering of the capacitors. In addition, it is desirable to further reduce the ESR.

There was thus a need to improve the two methods described in EP-A-1713103 and EP-A-1746613 for producing solid electrolytic capacitors in such a way that the ESR decreases further and does not increase markedly even under increased thermal loading.

BRIEF SUMMARY OF THE INVENTION

The invention relates to a method for producing electrolytic capacitors with low equivalent series resistance and low residual current, consisting of a solid electrolyte, an intermediate layer and an outer layer comprising conductive polymers, to electrolytic capacitors produced using this method and also to the use of electrolytic capacitors of this type.

The object was therefore to provide a method of this type and the capacitors improved thereby.

Now, it has surprisingly been found that these requirements may be met by applying a polymeric intermediate layer between the solid electrolyte and polymeric outer layer by means of dispersions comprising particles of a conductive polypyrrole and/or polyaniline and/or polythiophene, in particular of a conductive polythiophene, having an average particle diameter in the range of 1-60 nm and a binder.

The interacting of the diameter of the conductive polymer particles and the presence of a binder surprisingly has, in the formation of a polymeric intermediate layer, a considerable influence on the ESR of the electrolytic capacitors. Polymeric intermediate layers produced without binders lead, both with particles having an average size of 1-60 nm and with larger particles, to a higher ESR, although the conductivity of this intermediate layer is much better. Even polymeric intermediate layers produced with binders, but made of particles having an average diameter of greater than 60 nm, lead to a higher ESR.

The subject matter of the present invention is therefore a method for producing an electrolytic capacitor, in which onto a capacitor body (1), at least comprising
- a porous electrode body (2) of an electrode material and a dielectric (3) covering the surface of this electrode material,
- a solid electrolyte (4) which at least comprises an electrically conductive material and wholly or partially covers the dielectric surface, at least one dispersion a1) comprising at least particles b1) of an electrically conductive polymer and a dispersing agent d1) is applied, and the dispersing agent d1) is at least partially removed to form an electrically conductive polymeric intermediate layer,
and at least one dispersion a2) comprising at least particles b2) of an electrically conductive polymer having an average diameter of 70-1,000 nm, a dispersing agent d2) and a binder c2) is applied, and the dispersing agent d2) is at least partially removed and/or the binder c2) is cured to form an electrically conductive polymeric outer layer,
characterised in that the dispersion a1) comprises a binder c1) and the particles b1) of the conductive polymer in the dispersion a1) have an average diameter of 1-60 nm.

The diameter of the particles b1) and b2) is determined via an ultracentrifuge measurement. The general procedure is described in Colloid Polym. Sci. 267, 1113-1116 (1989). In the case of particles b1) and/or b2), which swell in the dispersion, the particle size is determined in the swollen state. A diameter distribution of the particles b1) and b2) relates to a mass distribution of the particles in the dispersion as a function of the particle diameter.

BRIEF DESCRIPTION OF THE SEVERAL VIEWS OF THE DRAWINGS

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown. In the drawings.

DETAILED DESCRIPTION OF THE INVENTION

The particles b1) of the conductive polymer in the dispersion a1) have in the methods according to the invention preferably an average diameter of 1-50 nm, particularly preferably of 5-40 nm.

The particles b1) of the conductive polymer in the dispersion a1) have in the method preferably a $d_{90}$ value of the diameter distribution of less than 100 nm, particularly preferably less than 80 nm, most particularly preferably less than 60 nm.

The particles b1) of the conductive polymer in the dispersion a1) have in the method preferably a $d_{10}$ value of the diameter distribution of greater than 1 nm, particularly preferably greater than 3 nm, most particularly preferably greater than 5 nm.

The particles b2) of the conductive polymer in the dispersion a2) have in the methods according to the invention preferably an average diameter of 90-800 nm, particularly preferably of 100-600 nm.

The particles b2) of the conductive polymer in the dispersion a2) have in the method preferably a $d_{90}$ value of the diameter distribution of less than 1,500 nm, particularly preferably less than 1,000 nm, most particularly preferably less than 800 nm.

The particles b2) of the conductive polymer in the dispersion a2) have in the method preferably a $d_{10}$ value of the diameter distribution of greater than 50 nm, particularly preferably greater than 70 nm, most particularly preferably greater than 80 nm The $d_{10}$ value of the diameter distribution states in this case that 10% of the total mass of all the particles of the conductive polymer in the dispersion can be assigned to particles of the type having a diameter of less than or equal to the $d_{10}$ value. The $d_{90}$ value of the diameter distribution states that 90% of the total mass of all the particles of the conductive polymer in the dispersion can be assigned to particles of the type having a diameter of less than or equal to the $d_{90}$ value.

The electrode material forms in the electrolytic capacitor produced using the method according to the invention a porous body having a large surface area, and is for example in the form of a porous sintered body or a roughened foil. This porous body will be referred to hereinafter also as the electrode body for short.

The electrode body covered with a dielectric will be referred to hereinafter also as the oxidised electrode body for short. The term "oxidised electrode body" also includes electrode bodies of the type covered with a dielectric which was not produced by oxidation of the electrode body.

The electrode body covered with a dielectric and also wholly or partially with a solid electrolyte will be referred to hereinafter also as the capacitor body for short.

The "outer surface of the capacitor body" refers to the outer faces of the capacitor body.

The electrically conductive layer produced using the method according to the invention from the dispersion a1) is referred to in the present document as the polymeric intermediate layer.

The electrically conductive layer produced using the method according to the invention from the dispersion a2) is referred to in the present document as the polymeric outer layer.

For the sake of simplicity, mention will be made hereinafter of dispersion a) when specifying preferred ranges which apply to dispersion a1) and dispersion a2). This notation means that the said preferred range applies to the dispersion a1) and/or dispersion a2). Should the same preferred range apply to both dispersions a1) and a2), they may nevertheless be different within this preferred range.

For the sake of simplicity, mention will be made hereinafter of particles b) when specifying preferred ranges which apply to particles b1) and particles b2). This notation means that the said preferred range applies to the particles b1) and/or particles b2). Should the same preferred range apply to both particles b1) and b2), they may nevertheless be different within this preferred range.

For the sake of simplicity, mention will be made hereinafter of binders c) when specifying preferred ranges which apply to binders c1) and binders c2). This notation means that the said preferred range applies to the binders c1) and/or binders c2). Should the same preferred range apply to both binders c1) and c2), they may nevertheless be different within this preferred range.

For the sake of simplicity, mention will be made hereinafter of dispersing agents d) when specifying preferred ranges which apply to dispersing agents d1) and dispersing agents d2). This notation means that the said preferred range applies to the dispersing agents d1) and/or dispersing agents d2). Should the same preferred range apply to both dispersing agents d1) and d2), they may nevertheless be different within this preferred range.

Preferably, use is made of dispersions a), the films of which have in the dried state a specific conductivity of greater than 10 S/cm, particularly preferably greater than 20 S/cm, most particularly preferably greater than 50 S/cm, exceedingly preferably greater than 100 S/cm and in a particularly preferred embodiment greater than 200 S/cm.

The dispersions a) preferably comprise no or only small amounts of metals and transition metals. The term "metals" refers in this case to metals or metal ions of main-group or subgroup metals, the latter being referred to hereinafter also as transition metals, of the periodic table of elements. As is known, transition metals, in particular, can damage the dielectric, so that the increased residual currents resulting therefrom greatly reduce the service life of the capacitors or even make it impossible to use the capacitors under harsh conditions, such as high temperatures and/or high air humidity.

The dispersion a) has in the method preferably a content of metals of less than 5,000 mg/kg, particularly preferably less than 1,000 mg/kg, most particularly preferably less than 200 mg/kg. Examples of metals include in this case Na, K, Mg, Al, Ca, Fe, Cr, Mn, Co, Ni, Cu, Ru, Ce or Zn.

The dispersion a) has in the method preferably a content of transition metals of less than 1,000 mg/kg, particularly preferably less than 100 mg/kg, most particularly preferably less than 20 mg/kg. Examples of transition metals include in this case Fe, Cu, Cr, Mn, Ni, Ru, Ce, Zn or Co, for example.

The dispersion a) has in the method preferably an iron content of less than 1,000 mg/kg, particularly preferably less than 100 mg/kg, most particularly preferably less than 20 mg/kg.

The low concentrations of metals in the dispersions have the major advantage that the dielectric is not damaged during the formation of the polymeric intermediate layer and/or the polymeric outer layer and during subsequent operation of the capacitor.

Preferably, the dispersion a) comprises at least one polymeric, organic binder c). Examples of particularly preferred polymeric, organic binders c) include polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulphones, melamine formaldehyde resins, epoxy resins, silicone resins or celluloses.

Further examples of polymeric organic binders c) preferably include those which are generated by adding crosslinking agents such as for example melamine compounds, blocked isocyanates or functional silanes, such as for example 3-glycidoxypropyltrialkoxysilane, tetraethoxysilane and tetraethoxysilane hydrolysate, or crosslinkable polymers such as for example polyurethanes, polyacrylates or polyolefins and subsequent crosslinking. Crosslinking products of this type, which are suitable as polymeric binders c), can also be formed for example by reacting the added crosslinking agents with polymeric anions which are optionally comprised in the dispersion a). Preference is given to binders c) of the type that are sufficiently stable to heat in order to withstand the temperature loads to which the finished capacitors are subsequently exposed, for example soldering temperatures of 220 to 260° C.

The solids content of the polymeric binder c) in the dispersion a) is 0.1-90 percent by weight (% by weight), preferably 0.5-30% by weight and most particularly preferably 0.5-10% by weight.

The dispersions a) can comprise one or more dispersing agents d). Examples of the dispersing agent d) include the following solvents: aliphatic alcohols such as methanol, ethanol, i-propanol and butanol; aliphatic ketones such as acetone and methyl ethyl ketone; aliphatic carboxylic acid esters such as acetic acid ethyl ester and acetic acid butyl ester; aromatic hydrocarbons such as toluene and xylene; aliphatic hydrocarbons such as hexane, heptane and cyclohexane; chlorinated hydrocarbons such as dichloromethane and dichloroethane; aliphatic nitriles such as acetonitrile, aliphatic sulphoxides and sulphones such as dimethyl sulphoxide and sulpholane; aliphatic carboxylic acid amides such as methylacetamide, dimethylacetamide and dimethylformamide; aliphatic and araliphatic ethers such as diethyl ether and anisole. Furthermore, water or a mixture of water with the aforementioned organic solvents can also be used as the dispersing agent d).

Preferred dispersing agents d) are water or other protic solvents such as alcohols, for example methanol, ethanol, i-propanol and butanol, and also mixtures of water with these alcohols; water is a particularly preferred solvent.

Optionally, the binder c) can also function as the dispersing agent d).

The term "polymers" includes in the sense of the invention all compounds comprising more than one same or different repeating unit.

The term "conductive polymers" refers in this case in particular to the compound class of the π-conjugated polymers having electrical conductivity after oxidation or reduction. Preferably, the term "conductive polymers" refers to π-conjugated polymers of the type having after oxidation electrical conductivity in the order of magnitude of at least 1 $\mu S\ cm^{-1}$.

The particles b) of the electrically conductive polymer in the dispersion a) preferably comprise at least one polythiophene, polypyrrole or polyaniline which are optionally substituted.

Particularly preferably, the particles b) of the electrically conductive polymer comprise at least one polythiophene with repeating units of general formula (I) or of general formula (II) or of general formula (X) or repeating units of formulae (I) and (II) or repeating units of formulae (I) and (X) or repeating units of formulae (II) and (X) or repeating units of formulae (I), (II) and (X)

wherein

A represents an optionally substituted $C_1$-$C_5$ alkylene radical,

R represents independently of one another H, a linear or branched, optionally substituted $C_1$-$C_{18}$ alkyl radical, an optionally substituted $C_5$-$C_{12}$ cycloalkyl radical, an optionally substituted $C_6$-$C_{14}$ aryl radical, an optionally substituted $C_7$-$C_{18}$ aralkyl radical, an optionally substituted $C_1$-$C_4$ hydroxyalkyl radical or a hydroxyl radical, x represents an integer from 0 to 8 and if a plurality of radicals R are bound to A, said radicals may be the same or different.

General formulae (I) and (II) are to be understood to mean that x substituents R can be bound to the alkylene radical A.

Particularly preferred are polythiophenes with repeating units of general formula (I) or (II) or repeating units of general formula (I) and (II), wherein A represents an optionally substituted $C_2$-$C_3$ alkylene radical and x represents 0 or 1.

Most particularly preferred as the conductive polymer of the particles b) is poly(3,4-ethylenedioxythiophene) which is optionally substituted.

The prefix "poly" denotes in the context of the invention the fact that more than one same or different repeating units are comprised in the polymer or polythiophene. The polythiophenes comprise a total of n repeating units of general formula (I) or of general formula (II) or of general formula (X) or of general formulae (I) and (II) or of general formulae (I) and (X) or of general formulae (II) and (X) or of general formulae (I), (II) and (X), wherein n is an integer from 2 to 2,000, preferably 2 to 100. The repeating units of general formula (I) or of general formula (II) or of general formula (X) or the repeating units of general formulae (I) and (II) or the repeating units of general formulae (I) and (X) or the repeating units of general formulae (II) and (X) or the repeating units of general formulae (I), (II) and (X) may within a polythiophene each be the same or different. Preferred are polythiophenes comprising in each case the same repeating units of general formula (I) or of general formula (II) or of general formula (X) or comprising in each case the same repeating units of general formulae (I) and (II), or of general formulae (I) and (X), or of general formulae (II) and (X), or comprising in each case the same repeating units of general formulae (I), (II) and (X). Particularly preferred are polythiophenes comprising in each case the same repeating units of general formula (I) or of general formula (II) or comprising in each case the same repeating units of general formulae (I) and (II).

At the end groups, the polythiophenes preferably each carry H.

$C_1$-$C_5$ alkylene radicals A are in the context of the invention preferably methylene, ethylene, n-propylene, n-butylene or n-pentylene. $C_1$-$C_{18}$ alkyl R preferably represent linear or branched $C_1$-$C_{18}$ alkyl radicals such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$ cycloalkyl radicals R represent for example cyclopentyl, cyclohexyl, cycloheptyl, cyclooctyl, cyclononyl or cyclodecyl, $C_6$-$C_{14}$ aryl radicals R represent for example phenyl or naphthyl, and $C_7$-$C_{18}$ aralkyl radicals R represent for example benzyl, o-, m-, p-tolyl, 2,3-, 2,4-, 2,5-, 2,6-, 3,4-, 3,5-xylyl or mesityl. The foregoing list serves to describe the invention by way of example and is not to be regarded as being conclusive.

Optionally further substituents of the radicals A and/or the radicals R include in the context of the invention numerous organic groups, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and also carboxylamide groups.

The substituents for polyaniline or polypyrrole are for example the above-listed radicals A and R and/or the further substituents of the radicals A and R. Unsubstituted polyanilines are preferred.

The scope of the invention includes all the foregoing and following radical definitions, parameters and illustrations, in general or mentioned in preferred ranges, with one another, i.e. also between the respective ranges and preferred ranges in any desired combination.

The polythiophenes used in the particles b) in the preferred method can be neutral or cationic. In preferred embodiments they are cationic, wherein the term "cationic" refers merely to the charges sitting on the polythiophene main chain. Depending on the substituent at the radicals R, the polythiophenes can carry positive and negative charges in the structural unit, the positive charges being located on the polythiophene main chain and the negative charges optionally being located at the radicals R substituted by sulphonate or carboxylate groups. In this case, the positive charges of the polythiophene main chain can be partly or completely saturated by the optionally present anionic groups at the radicals R. Viewed globally, the polythiophenes may in these cases be cationic, neutral or even anionic. Nevertheless, in the context of the invention, they are all regarded as being cationic polythiophenes, as the positive charges on the polythiophene main chain are decisive. The positive charges are not shown in the formulae, as their exact number and position are not optimally ascertainable. The number of positive charges is however at least 1 and at most n, wherein n is the total number of all the (same or different) repeating units within the polythiophene.

In order to compensate for the positive charge, in so far as this is not already carried out by the optionally sulphonate or carboxylate-substituted and thus negatively charged radicals R, the cationic polythiophenes require anions as counterions.

Counterions may be monomeric or polymeric anions, the latter being referred to hereinafter also as polyanions. The counterions may in the context of the invention be the same or different in the dispersion a1) and the dispersion a2).

Polymeric anions are preferred over monomeric anions, as they contribute to film formation and lead, on account of their size, to thermally stabler, electrically conductive films.

Polymeric anions may in this case for example be anions of polymeric carboxylic acids, such as polyacrylic acids, polymethacrylic acid or polymaleic acids, or polymeric sulphonic acids, such as polystyrene sulphonic acids and polyvinyl sulphonic acids. These polycarboxylic and polysulphonic acids may also be copolymers of vinyl carboxylic and vinyl sulphonic acids with other polymerisable monomers, such as acrylic acid esters and styrene.

Preferred in the aforementioned articles b) as the polymeric anion is an anion of a polymeric carboxylic or sulphonic acid, wherein the polymeric anions in the dispersion a1) and a2) may be different.

Particularly preferred as the polymeric anion is the anion of polystyrene sulphonic acid (PSS).

The molecular weight of the polyacids providing the polyanions is preferably 1,000 to 2,000,000, particularly preferably 2,000 to 500,000. The polyacids or their alkali salts are commercially available, for example polystyrene sulphonic acids and polyacrylic acids, or else can be produced using known methods (see for example Houben Weyl, Methoden der organischen Chemie, Vol. E 20 Makromolekulare Stoffe, Part 2, (1987), pp. 1141 et seq.).

Polymeric anion(s) and electrically conductive polymers can be comprised in the dispersion a) in particular at a ratio by weight of from 0.5:1 to 50:1, preferably of from 1:1 to 30:1, particularly preferably 2:1 to 20:1. The weight of the electrically conductive polymers corresponds in this case to the weighed-in portion of the monomers used, assuming that reaction is complete during the polymerisation.

The monomeric anions used are for example those of $C_1$-$C_{20}$ alkane sulphonic acids, such as methane, ethane, propane, butane or higher sulphonic acids such as dodecane sulphonic acid, of aliphatic perfluorosulphonic acids, such as trifluoromethane sulphonic acid, perfluorobutane sulphonic acid or perfluorooctane sulphonic acid, of aliphatic $C_1$-$C_{20}$ carboxylic acids such as 2-ethylhexyl carboxylic acid, of aliphatic perfluorocarboxylic acids, such as trifluoroacetic acid or perfluorooctanoic acid, and of aromatic sulphonic acids optionally substituted by $C_1$-$C_{20}$ alkyl groups such as benzene sulphonic acid, o-toluene sulphonic acid, p-toluene sulphonic acid or dodecyl benzene sulphonic acid and of cycloalkane sulphonic acids such as camphor sulphonic acid or tetrafluoroborates, hexafluorophosphates, perchlorates, hexafluoroantimonates, hexafluoroarsenates or hexachloroantimonates.

Preferred as monomeric anions are the anions of p-toluene sulphonic acid, methane sulphonic acid or camphor sulphonic acid.

Cationic polythiophenes comprising for charge compensation anions as counterions are often referred to by experts also as polythiophene/(poly)anion complexes.

The dispersion a) can also comprise further components such as surface-active substances, for example ionic and/or nonionic surfactants; adhesion promoters, such as for example organofunctional silanes or the hydrolysates thereof, for example 3-glycidoxypropyltrialkoxysilane, 3-aminopropyltriethoxysilane, 3-mercaptopropyltrimethoxysilane, 3-metacryloxypropyltrimethoxysilane, vinyltrimethoxysilane or octyltriethoxysilane; crosslinking agents such as melamine compounds, blocked isocyanates, functional silanes—for example tetraethoxysilane, alkoxysilane hydrolysate, for example based on tetraethoxysilane, epoxysilanes such as 3-glycidoxypropyltrialkoxysilane-polyurethanes, polyacrylates or polyolefin dispersions or further additives.

In the context of the invention, the dispersion a1) and/or the dispersion a2) can comprise surface-active substances, adhesion promoters, crosslinking agents and further additives either in each case alone or in any desired combination thereof.

Preferably, the dispersions a) comprise further conductivity-increasing additives, such as for example ether group-comprising compounds, such as for example tetrahydrofuran; lactone group-comprising compounds such as γ-butyrolactone, γ-valerolactone; amide or lactam group-comprising compounds such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone; sulphones and sulphoxides, such as for example sulpholane (tetramethylene sulphone), dimethyl sulphoxide (DMSO); sugar or sugar derivatives, such as for example saccharose, glucose, fructose, lactose, sugar alcohols, such as for example sorbitol, mannitol; imides, such as for example succinimide or maleimide; furan derivatives, such as for example 2-furancarboxylic acid, 3-furancarboxylic acid, and/or di- or polyalcohols, such as for example ethylene glycol, glycerol or di- or triethylene glycol. Particularly preferably, the conductivity-increasing additives used are tetrahydrofuran, N-methylformamide, N-methylpyrrolidone, ethylene glycol, dimethyl sulphoxide or sorbitol. The further additives can be comprised in the dispersion a1) and the dispersion a2) either in each case alone or in any desired combination thereof, and they may be different in the dispersion a1) and the dispersion a2).

The dispersions a) can have a pH of from 1 to 14, a pH of 1 to 8 being preferred, a pH of 4 to 8 being particularly preferred. Above all for corrosion-sensitive dielectrics, such as for example aluminium oxides or niobium oxides, dispersions having a pH of from 4 to 8 are preferred in order not to damage the dielectric.

In order to set the pH, bases or acids, for example, can be added to the dispersions. Preference is given to those additives which do not impair the film formation of the dispersions and are not volatile at elevated temperatures, for example soldering temperatures, but remain under these conditions in the polymeric intermediate layer and/or the polymeric outer layer, such as for example the bases 2-dimethylaminoethanol, 2,2'-iminodiethanol or 2,2',2''-nitrilotriethanol and the acid polystyrene sulphonic acid.

Depending on the type of application, the viscosity of the dispersion a1) may be between 0.1 and 1,000 mPa·s (measured at 20° C. and a shear rate of 100 $s^{-1}$ using a rheometer). The viscosity is preferably 0.5 to 200 mPa·s, particularly preferably between 0.5 and 100 mPa·s, most particularly preferably 1 to 70 mPa·s.

Depending on the type of application, the viscosity of the dispersion a2) may be between 0.1 and 100,000 mPa·s (measured at 20° C. and a shear rate of 100 $s^{-1}$ using a rheometer). The viscosity is preferably 1 to 10,000 mPa·s, particularly preferably between 10 and 1,000 mPa·s, most particularly preferably 30 to 500 mPa·s.

The electrically conductive material of the solid electrolyte can comprise a conductive polymer or non-polymeric conductive material, such as for example charge transfer complexes, such as for example TCNQ (7,7,8,8-tetracyano-1,4- quinodimethane), manganese dioxide or salts, such as for example those which can form ionic liquids.

Preferably, the solid electrolyte comprises a conductive polymer. The conductive polymers used may be the above-mentioned conductive polymers which are also used for the polymeric intermediate layer and/or polymeric outer layer. Particularly preferably, the solid electrolyte comprises poly (3,4-ethylenedioxythiophene)/polystyrene sulphonic acid as the conductive polymer.

The solid electrolyte forms on the dielectric surface a layer having a thickness of preferably less than 1,000 nm, particularly preferably less than 200 nm, most particularly preferably less than 50 nm.

The coverage of the dielectric with the solid electrolyte can be determined in the following manner: The capacitance of the capacitor is measured in the dry and moist state at 120 Hz. The degree of coverage is the ratio of the capacitance in the dry state to the capacitance in the moist state expressed as a percentage. The term "dry state" means that the capacitor was dried for several hours at elevated temperature (80-120° C.) before being measured. The term "moist state" means that the capacitor was exposed for several hours to saturated air humidity at elevated pressure, for example in a steam pressure boiler. In this case, the moisture penetrates pores which are not covered by the solid electrolyte and acts as a liquid electrolyte there.

The coverage of the dielectric by the solid electrolyte is preferably greater than 50%, particularly preferably greater than 70%, most particularly preferably greater than 80%.

Figure 2:
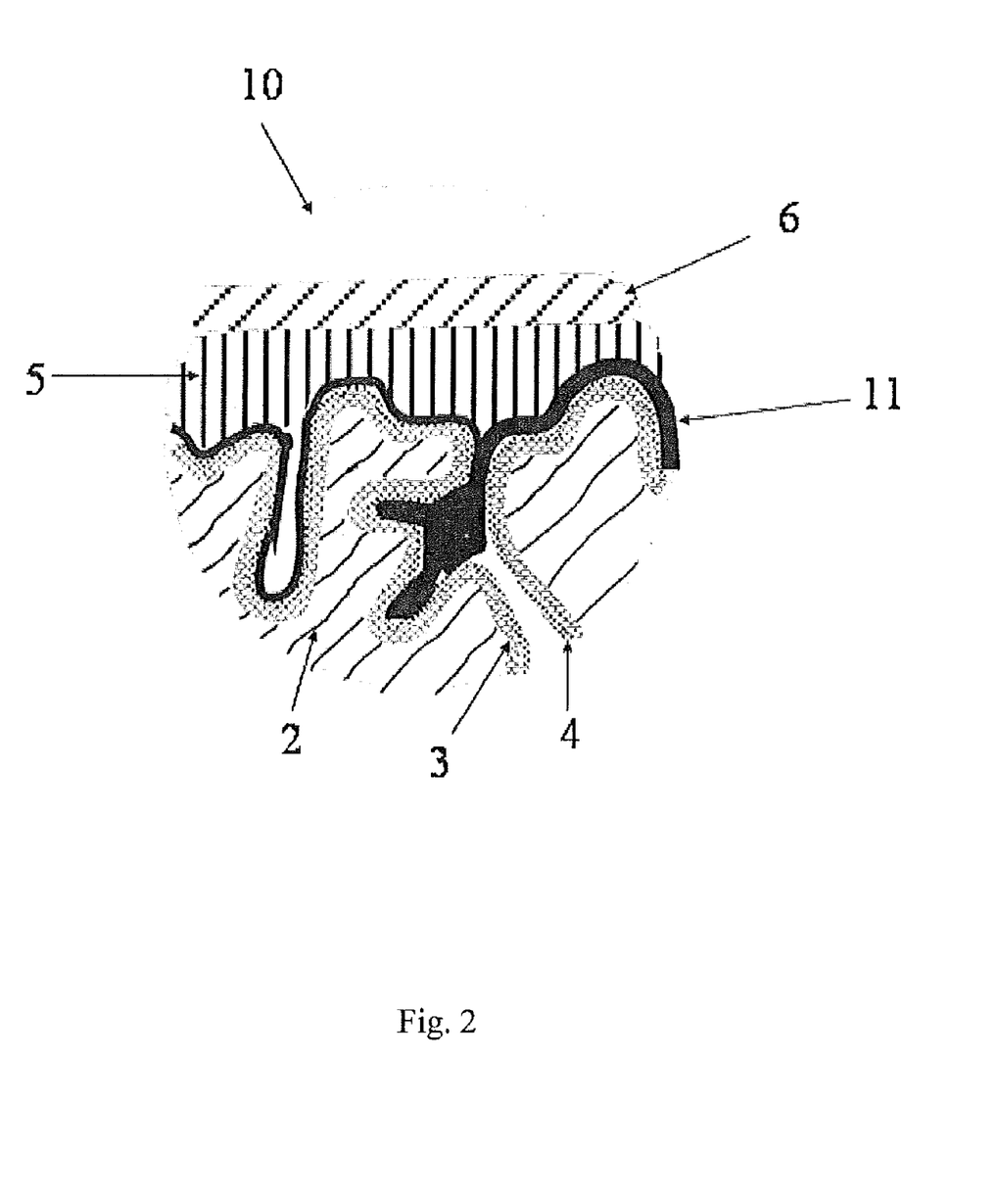
FIG. 2 is the enlarged schematic image detail 10 from FIG. 1.

The polymeric intermediate layer is preferably located, as illustrated schematically and by way of example in FIG. 2, in all or a part of the outer edge region of the capacitor body. The term "outer edge region" refers to the outer faces and the pore structure positioned directly therebelow of the capacitor body. The polymeric intermediate layer can fill the pores in the edge region of the capacitor body or be positioned in the edge region as a layer on the surface of the capacitor body. The polymeric intermediate layer can also extend beyond the edge region into the interior of the capacitor body.

Figure 1:
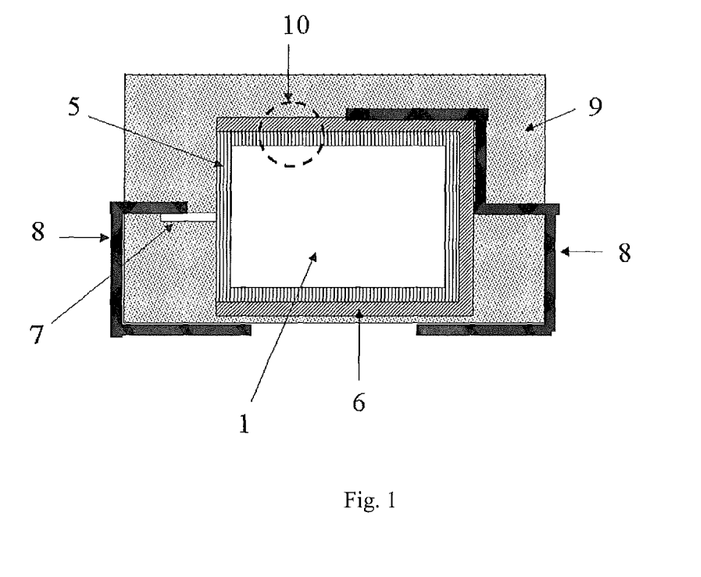
FIG. 1 is is a schematic illustration of the construction of a solid electrolytic capacitor in accordance with one embodiment of the present invention.

The polymeric outer layer is preferably located, as illustrated schematically and by way of example in FIG. 1 and FIG. 2, on all or a part of the outer surface of the capacitor body. The term "outer surface" refers to the outer faces of the capacitor body.

FIG. 1 is a schematic illustration of the construction of a solid electrolytic capacitor based on the example of a tantalum capacitor with 1 capacitor body
5 polymeric outer layer
6 graphite/silver layer
7 wire contact to the electrode body 2
8 outer contacts
9 encapsulation
10 image detail FIG. 2 shows the enlarged image detail 10 from FIG. 1 representing the schematic layer construction of the tantalum capacitor with 10 image detail
2 porous electrode body (anode)
3 dielectric
4 solid electrolyte (cathode)
5 polymeric outer layer
6 graphite/silver layer
11 polymeric intermediate layer The thickness of the polymeric intermediate layer is preferably 0.001-50 μm, particularly preferably 0.01-10 μm, most particularly preferably 0.05-5 μm, especially particularly preferably 0.1-1 μm. The layer thickness of the polymeric intermediate layer may vary in the outer edge region.

The polymeric intermediate layer can have, with respect to its composition with regard to the binders c1) and conductive polymers, a homogeneous or inhomogeneous distribution. Homogeneous distributions are preferred.

The polymeric intermediate layer can be composed of a plurality of polymeric intermediate layers which may be different.

The thickness of the polymeric outer layer is preferably 1-1,000 μm, particularly preferably 1-100 μm, most particularly preferably 2-50 μm, especially particularly preferably 4-20 μm. The layer thickness may vary on the outer surface. In particular, the layer thickness at the rims of the capacitor body may be thicker or thinner than on the side faces of the capacitor body. An almost homogeneous layer thickness is however preferred.

The polymeric outer layer can have, with respect to its composition with regard to the binders c2) and conductive polymers, a homogeneous or inhomogeneous distribution. Homogeneous distributions are preferred.

The polymeric outer layer may be part of a multilayered system forming the outer layer of the capacitor body. Further functional layers may also be located on the polymeric outer layer. Furthermore, a plurality of polymeric outer layers may be located on the capacitor body.

In a particularly preferred embodiment, the electrolytic capacitor produced using the new method comprises a solid electrolyte comprising poly(3,4-ethylenedioxythiophene) (PEDT) as the conductive material, a polymeric intermediate layer comprising polystyrene sulphonic acid (PSS) and poly (3,4-ethylenedioxythiophene) (the latter is frequently referred to in the literature also as PEDT/PSS or PEDOT/PSS) and a polymeric outer layer comprising polystyrene sulphonic acid (PSS) and poly(3,4-ethylenedioxythiophene).

In a most particularly preferred embodiment, the electrolytic capacitor produced using the new method comprises a solid electrolyte comprising PEDT/PSS, a polymeric intermediate layer comprising PEDT/PSS and a binder c1) and a polymeric outer layer comprising PEDT/PSS and a binder c2). The solid electrolytic capacitor produced using the methods according to the invention is distinguished by a low residual current and low equivalent series resistance. The polymeric intermediate layer leads to a lower ESR and to higher stability of the ESR under thermal loading.

In principle, an electrolytic capacitor of this type according to the invention can be produced in the following manner: Firstly, a valve metal powder having a high surface area is for example compressed and sintered to form a porous electrode body. An electrical contact wire, preferably made of a valve metal such as for example tantalum, is in this case conventionally also pressed into the electrode body. Alternatively, it is also possible to etch metal foils in order to obtain a porous foil. In a wound capacitor, a porous anode foil, which forms the electrode body, and a cathode foil are separated by a separator and wound on.

The electrode body is covered, for example by electrochemical oxidation, with a dielectric, i.e. an oxide layer. A conductive polymer, which forms the solid electrolyte, is then chemically or electrochemically deposited on the dielectric, for example by means of oxidative polymerisation.

For this purpose, precursors for producing conductive polymers, one or more oxidising agents, and optionally counterions, are applied jointly or successively to the dielectric of the porous electrode body and polymerised by chemical oxidation, or precursors for producing conductive polymers and counterions are polymerised by electrochemical polymerisation on the dielectric of the porous electrode body. Dispersions or solutions of conductive polymers, such as for example optionally substituted polythiophenes, polypyrroles or polyanilines, can also be used as the conductive material to form the solid electrolyte. Preference is given to dispersions of conductive polythiophenes based on poly(3,4-ethylenedioxythiophene), such as are described for example in WO 2007/031206.

According to the invention, a dispersion a1) comprising at least particles b1) of an electrically conductive polymer, a binder c1) and a dispersing agent d1) is then applied to the capacitor body, and the dispersing agent d1) is at least partially removed and/or the binder is cured to form a polymeric intermediate layer. According to the invention, a dispersion a2) comprising at least particles b2) of an electrically conductive polymer, a binder c2) and a dispersing agent d2) is then applied to the capacitor body, and the dispersing agent d2) is at least partially removed and/or the binder is cured to form a polymeric outer layer. Optionally, further layers are applied to the polymeric outer layer. A covering with layers having high conductivity, such as graphite and silver, or a metallic cathode body, such as for example in aluminium wound capacitors, serves as an electrode for discharging the current. Finally, the capacitor is contacted and encapsulated.

Also preferred is a method for producing electrolytic capacitors, characterised in that the electrode material is a valve metal or a compound having electrical properties comparable to a valve metal.

The term "valve metal" refers in the context of the invention to those metals whose oxide layers do not allow current to flow uniformly in both directions: In the case of an anodically applied voltage, the oxide layers of the valve metals block the flow of current, while in the case of a cathodically applied voltage large currents which can destroy the oxide layer occur. The valve metals include Be, Mg, Al, Ge, Si, Sn, Sb, Bi, Ti, Zr, Hf, V, Nb, Ta and W and also an alloy or compound of at least one of these metals with other elements. The best-known representatives of valve metals are Al, Ta, and Nb. Compounds having electrical properties comparable to a valve metal are those which have metallic conductivity, are oxidisable and whose oxide layers have the properties described hereinbefore. For example, NbO has metallic conductivity, but is generally not regarded as a valve metal. However, layers of oxidised NbO display the typical properties of valve metal oxide layers, so that NbO or an alloy or compound of NbO with other elements are typical examples of such compounds having electrical properties comparable to a valve metal.

Preference is given to electrode materials made of tantalum, aluminium and electrode materials of the type based on niobium or niobium oxide.

The term "electrode materials based on niobium or niobium oxide" refers to materials of the type in which niobium or niobium oxide are the component having the largest substance amount fraction.

The electrode material based on niobium or niobium oxide is preferably niobium, NbO, a niobium oxide $NbO_x$, wherein x can assume values of from 0.8 to 1.2, niobium nitride, niobium oxynitride or mixtures of these materials or an alloy or compound of at least one of these materials with other elements.

Preferred alloys are alloys comprising at least one valve metal, such as for example Be, Mg, Al, Ge, Si, Sn, Sb, Bi, Ti, Zr, Hf, V, Nb, Ta or W.

Accordingly, the term "oxidisable metal" refers not only to metals, but also to an alloy or compound of a metal with other elements, provided that they have metallic conductivity and are oxidisable.

The oxidisable metals are for example sintered in powder form to form a porous electrode body or a porous structure is impressed on a metallic body. The latter process can for example be carried out by etching a foil. Preferably, the electrode body has rounded-off corners and/or rims in order to improve the external coverage with the polymeric outer layer.

The porous electrode bodies are for example oxidised in a suitable electrolyte, such as for example phosphoric acid, by applying a voltage. The magnitude of this forming voltage is dependent on the oxide layer thickness to be achieved or the future application voltage of the capacitor. Preferred forming voltages are 1 to 800 V, particularly preferably 1 to 300 V.

In order to produce the electrode body, use is made of metal powders preferably having a specific charge of from 1,000 to 1,000,000 µC/g, particularly preferably having a specific charge of from 5,000 to 500,000 µC/g, most particularly preferably having a specific charge of from 5,000 to 300,000 µC/g, exceedingly preferably having a specific charge of from 10,000 to 200,000 µC/g.

The specific charge of the metal powder is in this case calculated as follows:

Specific charge of the metal powder=
(capacitance*anodising voltage)/weight of the oxidised electrode body.

The capacitance is in this case obtained from the capacitance of the oxidised electrode body measured at 120 Hz in an aqueous electrolyte. The electrical conductivity of the electrolyte is in this case sufficiently great that, at 120 Hz, there is not yet a drop in capacitance on account of the electrical resistance of the electrolyte. For example, 18% aqueous sulphuric acid electrolytes are used for the measurement.

The electrode bodies used have a porosity of from 10 to 90%, preferably of from 30 to 80%, particularly preferably of from 50 to 80%.

The porous electrode bodies have an average pore diameter of from 10 to 10,000 nm, preferably of from 50 to 5,000 nm, particularly preferably of from 100 to 3,000 nm.

The porous electrode body preferably has a volume of from 0.001 mm³ to 100,000 mm³. It has surprisingly been found that the polymeric intermediate layer significantly reduces the ESR, in particular in small electrode bodies. Electrode bodies having a volume of from 0.001 mm³ to 10 mm³ are therefore particularly preferred; electrode bodies having a volume of from 0.001 mm³ to 5 mm³ are most particularly preferred.

A particularly preferred subject matter of the present invention is accordingly a method for producing electrolytic capacitors, characterised in that the valve metal or the compound having electrical properties comparable to a valve metal is tantalum, niobium, aluminium, titanium, zirconium, hafnium, vanadium, an alloy or compound of at least one of these metals with other elements, NbO or an alloy or compound of NbO with other elements.

The dielectric preferably consists of an oxide of the electrode material. It optionally comprises further elements and/or compounds.

The capacitance of the capacitor is dependent, not only on the type of the dielectric, but also on the surface area and the thickness of the dielectric. The specific charge is a measure of how much charge per unit of weight the oxidised electrode body can absorb. The specific charge of the capacitor is calculated as follows:

Specific charge of the capacitor=
(capacitance*nominal voltage)/weight of the oxidised electrode body.

The capacitance is obtained in this case from the capacitance of the finished capacitor measured at 120 Hz and the nominal voltage is the specified use voltage of the capacitor (rated voltage). The weight of the oxidised electrode body relates to the pure weight of the porous electrode material covered with dielectric without the polymer, contacts and encapsulations.

Preferably, the electrolytic capacitors produced using the new method have a specific charge of from 500 to 500,000 µC/g, particularly preferably a specific charge of from 2,500 to 250,000 µC/g, most particularly preferably a specific charge of from 2,500 to 150,000 µC/g, exceedingly preferably a specific charge of from 5,000 to 100,000 µC/g.

The term "precursors for the production of conductive polymers of the particles b) in the dispersion a)", referred to hereinafter also as precursors, refers to corresponding monomers or the derivatives thereof. Mixtures of different precursors can also be used. Suitable monomeric precursors are for example optionally substituted thiophenes, pyrroles or anilines, preferably optionally substituted thiophenes, particularly preferably optionally substituted 3,4-alkylenedioxythiophenes, 3,4-alkyleneoxythiathiophenes or thieno[3,4-b]thiophenes.

Examples of optionally substituted 3,4-alkylenedioxythiophenes, 3,4-alkyleneoxythiathiophenes or thieno[3,4-b]thiophenes include the compounds of general formula (III) or of general formula (IV) or of general formula (XI) or a mixture of thiophenes of general formulae (III) and (IV) or a mixture of thiophenes of general formula (III) and (XI), or a mixture of thiophenes of general formula (IV) and (XI) or a mixture of thiophenes of general formula (III), (IV) and (XI)

wherein
A represents an optionally substituted $C_1$-$C_5$ alkylene radical, preferably an optionally substituted $C_2$-$C_3$ alkylene radical,

R represents a linear or branched, optionally substituted $C_1$-$C_{18}$ alkyl radical, a preferably linear or branched, optionally substituted $C_1$-$C_{14}$ alkyl radical, an optionally substituted $C_5$-$C_{12}$ cycloalkyl radical, an optionally substituted $C_6$-$C_{14}$ aryl radical, an optionally substituted $C_7$-$C_{18}$ aralkyl radical, an optionally substituted $C_1$-$C_4$ hydroxyalkyl radical, a preferably optionally substituted $C_1$-$C_2$ hydroxyalkyl radical, or a hydroxyl radical, x represents an integer from 0 to 8, preferably from 0 to 6, particularly preferably 0 or 1 and if a plurality of radicals R are bound to A, said radicals may be the same or different.

Most particularly preferred monomeric precursors are optionally substituted 3,4-ethylenedioxythiophenes.

Examples of substituted 3,4-ethylenedioxythiophenes include the compounds of general formula (V), wherein
R and x have the meaning mentioned for general formulae (III) and (IV).

The term "derivatives of these monomeric precursors" refers in the sense of the invention to dimers or trimers of these monomeric precursors, for example. Derivatives of higher molecular weight, i.e. tetramers, pentamers, etc., of the monomeric precursors are also possible as the derivatives.

Examples of derivatives of substituted 3,4-alkylenedioxythiophenes include the compounds of general formula (VI), (VI)

wherein
n represents an integer from 2 to 20, preferably 2 to 6, particularly preferably 2 or 3, and A, R and x have the meaning mentioned for general formulae (III) and (IV).

The derivatives can be constructed from both the same and different monomer units and be used in pure form and also mixed with one another and/or with the monomeric precursors. Oxidised or reduced forms of these precursors are also included, in the sense of the invention, in the term "precursors", in so far as the same conductive polymers are produced during polymerisation thereof as in the precursors listed hereinbefore.

Substituents for the above-mentioned precursors, in particular for thiophenes, preferably for 3,4-alkylenedioxythiophenes, may be in the form of the radicals R mentioned for general formulae (III), (IV) or (XI).

Examples of substituents for pyrroles and anilines include the above-listed radicals A and R and/or the further substituents of the radicals A and R.

Optionally further substituents of the radicals A and/or the radicals R may be in the form of the organic groups mentioned in relation to general formulae (I), (II) or (X).

Methods for producing monomeric precursors for the production of conductive polymers and also the derivatives thereof are known to the person skilled in the art and described for example in L. Groenendaal, F. Jonas, D. Freitag, H. Pielartzik & J. R. Reynolds, Adv. Mater. 12 (2000) 481-494 and the literature cited therein.

The 3,4-alkyleneoxythiathiophenes of formula (III) required for the production of the polythiophenes to be used are known to the person skilled in the art or can be produced using known methods (for example according to P. Blanchard, A. Cappon, E. Levillain, Y. Nicolas, P. Frère and J. Roncali, Org. Lett. 4 (4), 2002, S. 607-609).

The thieno[3,4-b]thiophenes of formula (XI) required for the production of the polythiophenes to be used are known to the person skilled in the art or can be produced using known methods (for example according to US2004/0074779A1).

The dispersions are produced from the above-described precursors, for example as under the conditions mentioned in EP-A 440 957. An improved variant for the production of the dispersions is the use of an ion exchanger to remove the inorganic salt content or a part thereof. A variant of this type is for example described in DE-A 19627071. The ion exchanger can for example be stirred up with the product or the product is conveyed via a column filled with ion exchanger. The use of the ion exchanger allows the above-described low metal contents to be achieved, for example.

The particle size of the particles b) in the dispersion a) can be reduced after desalination by means of a high-pressure homogeniser, for example. This process can also be repeated to intensify the effect. Particularly high pressures of between 100 and 2,000 bar have proven advantageous to greatly reduce the particle size.

A production of a polyaniline/polyanion or polythiophene/polyanion complex and subsequent dispersion or redispersion in one or more solvent(s) are also possible.

The solids content of the particles b) of the electrically conductive polymer in the dispersion a) is 0.1-90% by weight, preferably 0.5-30% by weight and most particularly preferably 0.5-10% by weight.

The particles b) of the conductive polymer preferably form a stable dispersion. However, it is also possible to use unstable dispersions in that these are for example stirred, rolled or shaken up prior to use in order to ensure a uniform distribution of the particles b).

The dispersions a) are applied to the capacitor body using known methods, for example by spin coating, steeping, pouring, dropping, injecting, spraying, doctoring, brushing or imprinting, for example inkjet, screen or pad printing.

After application of the dispersion a), the dispersing agent d) is preferably removed so that the polymeric intermediate layer or the polymeric outer layer can form from the particles b) and optionally further additives in the dispersion. However, it is also possible for at least a part of the dispersing agent d) to remain in the polymeric intermediate layer or the polymeric outer layer. Depending on the type of the dispersing agent d), said dispersing agent can be cured both after complete and after merely partial removal of the remaining part.

The dispersing agent d) can be removed after the application of the dispersion by simple evaporation at room temperature. However, in order to achieve higher processing speeds, it is more advantageous to remove the dispersing agents d) at elevated temperatures, for example at temperatures of from 20 to 300° C., preferably 40 to 250° C. A subsequent thermal treatment may be directly linked to the removal of the solvent or else be carried out after an interval following the completion of the coating.

The duration of the heat treatment is, depending on the type of the dispersion used for the coating, 5 seconds to several hours. Temperature profiles having different temperatures and dwell times can also be used for the thermal treatment.

The heat treatment can for example be carried out in such a way that the coated oxidised electrode bodies are moved through a heating chamber, which is at the desired temperature, at a speed such that the desired dwell time is reached at the selected temperature, or brought into contact with a heating plate, which is at the desired temperature, for the desired dwell time. Furthermore, the heat treatment can for example be carried out in a heating furnace or a plurality of heating furnaces each having different temperatures.

Depending on the type of the capacitor body, it may be advantageous to form the polymeric intermediate layer by repeatedly applying the dispersion a1) and at least partially removing the dispersing agent d1) in order to achieve a thicker polymeric intermediate layer.

Depending on the type of the capacitor body, it may be advantageous to form the polymeric outer layer by repeatedly applying the dispersion a2) and at least partially removing the dispersing agent d2) in order to achieve thicker polymeric outer layers.

After production of the polymeric outer layer, optionally further layers having high conductivity, such as for example graphite and/or silver layers, are preferably applied to the capacitor; the capacitor is contacted and encapsulated.

The method according to the invention may be used to produce in a particularly simple manner solid electrolytic capacitors which have a dense polymeric outer layer and are distinguished by a low ESR and low residual currents. In addition, the stability of the ESR under thermal loading is increased in capacitors produced using the method according to the invention. The electrolytic capacitors produced using the method according to the invention are also the subject matter of the invention.

The electrolytic capacitors produced in accordance with the invention are ideal, on account of their low residual current and their low ESR, for use as a component in electronic circuits, for example as a smoothing capacitor (filter capacitor) or anti-interference capacitor (decoupling capacitor). The use is also the subject matter of the invention. Preference is given to electronic circuits, such as are located for example in computers (desktops, laptops, servers), in computer peripherals (for example PC cards), in portable electronic appliances, such as for example mobile telephones, digital cameras or entertainment electronics, in appliances for entertainment electronics, such as for example in CD/DVD players and computer games consoles, in navigation systems, in telecommunications facilities, in household appliances, in power supplies or in automobile electronics.

The following examples serve to illustrate the invention by way of example and are not to be interpreted as entailing any limitation.

EXAMPLES

Example 1

Production of Dispersions of Conductive Polymers

A) Poly(3,4-ethylenedioxythiophene)/polystyrene Sulphonate Dispersion Having an Average Particle Size of Greater than 60 nm 1,736 g of deionised water, 660 g of an aqueous polystyrene sulphonic acid solution having an average molecular weight $M_w$ of 70,000 and a solids content of 3.8% by weight were placed in a 5 l glass reactor with a stirrer and thermometer. The reaction temperature was kept between 20 and 25° C. 10.2 g of 3,4-ethylenedioxythiophene were added while stirring. The solution was stirred for 30 minutes (min). Subsequently, 0.06 g of iron (III) sulphate and 19 g of sodium persulphate were added and the solution was stirred for a further 24 hours (h). After completion of the reaction, 200 ml of a strongly acidic cation exchanger (Lewatit S100, Lanxess AG) and 500 ml of a weakly basic anion exchanger (Lewatit MP 62, Lanxess AG) were added to remove inorganic salts and the solution was stirred for a further 2 h. The ion exchanger was removed by filtration.

To determine the solids content, 5 g of the dispersion were dried for 14 hours at 100° C. The dispersion A had a solids content of 1%.

The dispersion A had the following particle size distribution:
$d_{10}$ 60 nm
$d_{50}$ 163 nm
$d_{90}$ 271 nm The diameter of the particles b) of the conductive polymer relates to a mass distribution of the particles b) in the dispersion as a function of the particle diameter. The analysis was carried out via an ultracentrifuge measurement. The particle size was determined in the swollen state of the particles.

B) Poly(3,4-ethylenedioxythiophene)/polystyrene Sulphonate Dispersion Having an Average Particle Size of Less than 60 nm A portion of the PEDT/PSS dispersion A was homogenised ten times at a pressure of 700 bar using a high-pressure homogenises.

The dispersion B thus produced displayed the following particle size distribution:
$d_{10}$ 20 nm
$d_{50}$ 28 nm
$d_{90}$ 44 nm The solids content of the dispersion B was 1%.

10 g of the dispersion B were added to 0.5 g of dimethyl sulphoxide (DMSO) and stirred up to form a dispersion. A portion of this dispersion was spun onto a glass slide (26 mm*26 mm*1 mm) by means of a spin coater (Chemat Technology KW-4A). The sample was dried for 10 min at 120° C. Subsequently, two opposing rims of the slide were coated with conducting silver. Once the conducting silver had dried, the two silver strips were contacted and the surface resistance was determined using a Keithley 199 multimeter. The layer thickness was determined using a Tencor Alpha Step 500 surface profiler. The specific conductivity r in accordance with $\sigma=1/(R_\square*d)$ was calculated from the surface resistance and layer thickness d. The layer thickness was 75 nm and the specific conductivity was 430 S/cm.

The viscosity of the dispersion was 30 mPa*s at a shear rate of 100 Hz and 20° C. An ICP analysis of the metal contents of the dispersion B yielded the following values:

sodium (Na): 130 mg/kg
magnesium (Mg): 0.62 mg/kg
aluminium (Al): 1.1 mg/kg
silicon (Si): 1.3 mg/kg
phosphorus (P): 6.3 mg/kg
potassium (K): 0.71 mg/kg
calcium (Ca): 4.0 mg/kg
chromium (Cr): 0.17 mg/kg
iron (Fe): 1.07 mg/kg
zinc (Zn): <0.01 mg/kg C) Poly(3,4-ethylenedioxythiophene)/polystyrene Sulphonate Dispersion for the Polymeric Outer Layer 2.5 l of demineralised water were placed in a 5 l glass reactor with a stirrer and thermometer. 214.2 g of p-toluenesulphonic acid monohydrate and 2.25 g of iron (III) sulphate heptahydrate were introduced while stirring. Once everything had dissolved, 85.8 g of 3,4-ethylenedioxythiophene were added and the mixture was stirred for 30 minutes. Subsequently, 192.9 g of sodium peroxodisulphate were introduced while stirring and the mixture was stirred for a further 24 hours at room temperature. After the end of the reaction, the resulting PEDT/toluenesulphonate powder was removed by filtration on a porcelain nutsch filter, washed with 3 l of demineralised water and finally dried for 6 hours at 100° C. 89 g of a bluish black PEDT toluenesulphonate powder were obtained.

180 g of the PEDT/PSS dispersion A, 10 g of a sulphopolyester (Eastek 1100, solids content 30%, Eastman), 8 g of dimethyl sulphoxide, 1 g of 3-glycidoxypropyltrimethoxysilane (Silquest A-187, OSi Specialties) and 0.4 g of wetting agent (Dynol 604, Air Products) were mixed intensively for one hour in a beaker glass with a stirrer. Subsequently, 2 g of the PEDT/toluenesulphonate powder were dispersed by means of a bead mill dissolver unit. For this purpose, 300 g of zirconium oxide beads (Ø 1 mm) were added and the mixture was stirred at 7,000 rpm for 1 hour while cooling with water. Finally, the ground beads were separated off via a 0.8 μm sieve. This dispersion C obtained had a solids content of 4.7% and a viscosity of 200 meas. The specific conductivity was 90 S/cm.

Example 2

Production of Capacitors Using the Method According to the Invention 2.1. Production of Oxidised Electrode Bodies:

Tantalum powder having a specific capacitance of 30,000 μFV/g was compressed and sintered into pellets with the inclusion of a tantalum wire in order to form an electrode body having the dimensions 0.8 mm*0.8 mm*1 mm. 15 of these porous electrode bodies were anodised to 100 V in a phosphoric acid electrolyte to form a dielectric.

2.2 Production of the Solid Electrolyte 100 g of the dispersion B from Example 1 and 4 g of dimethyl sulphoxide (DMSO) were mixed intensively in a beaker glass with a stirrer to form a dispersion B1.

The oxidised electrode bodies were steeped in this dispersion B1 for 1 min. Afterwards drying was carried out at 120° C. for 10 min. Steeping and drying were carried out nine further times.

2.3 Production of the Polymeric Intermediate Layer According to the Invention 100 g of the dispersion B (from Example 1), 3 g of a sulphopolyester (Eastek 1100, solids content 30% in water) and 4 g of dimethyl sulphoxide (DMSO) were mixed intensively in a beaker glass with a stirrer to form a dispersion B2. The specific conductivity of the dispersion B2 was 200 S/cm.

The oxidised electrode bodies were steeped in this dispersion B2 for 1 min. Afterwards drying was carried out at 120° C. for 10 min. Steeping and drying were carried out two further times.

2.4 Production of a Polymeric Outer Layer

The capacitor bodies were steeped in the dispersion C from Example 1 and subsequently dried for 10 min at 120° C.

Finally, the electrode bodies were covered with a graphite and silver layer.

The average electrical values of the 15 capacitors produced in the foregoing manner are set out in Table 1. The capacitance (in microfarads) and the loss factor (as a percentage) were determined at 120 Hz and the equivalent series resistance (ESR) (in milliohms) was determined at 100 kHz by means of an LCR meter (Agilent 4284A). The residual current (in microamperes) was determined using a Keithley 199 multimeter three minutes after applying a 25 V voltage.

Example 3

Production of Capacitors Using the Method According to the Invention 15 capacitors were produced as in Example 2, although the following dispersion was used as the material to produce the polymeric intermediate layer:

100 g of the dispersion B (from Example 1), 1 g of an aqueous phenolic resin dispersion (Phenodur VPW 1942, solids content 52%, Cytec Industries), 4 g of dimethyl sulphoxide (DMSO), 0.5 g of dimethylethanolamine (50% solution in water) and 0.2 g of wetting agent (Dynol 604, Air Products) were mixed intensively in a beaker glass with a stirrer to form a dispersion. The dispersion had a pH of 6.5.

The average electrical values of the 15 capacitors produced in the foregoing manner are set out in Table 1.

Example 4

Production of Capacitors Using the Method According to the Invention 15 capacitors were produced as in Example 2, although the following dispersion was used as the material to produce the polymeric intermediate layer:

100 g of the dispersion B (from Example 1), 2.1 g of an epoxy novolac resin (EPI-REZ 6006 W-70, solids content 70%, Resolution), 0.5 g of dimethylethanolamine (50% solution in water), 5 g of ethylene glycol, 0.5 g of 3-glycidoxypropyltrimethoxysilane (Silquest A-187, OSi Specialties) and 0.2 g of wetting agent (Surfynol E-104, Air Products) were mixed intensively in a beaker glass with a stirrer to form a dispersion.

The average electrical values of the 15 capacitors produced in the foregoing manner are set out in Table 1.

Comparative Example 1

Production of Capacitors without a Polymeric Intermediate Layer 15 capacitors were produced as in Example 2, although without applying a polymeric intermediate layer as in 2.3 in Example 2.

The average electrical values of the 15 capacitors produced in the foregoing manner are set out in Table 1.

TABLE 1

|  | Capacitance [µF] | Loss factor [%] | ESR [mΩ] | Residual current [µA] |
| --- | --- | --- | --- | --- |
| Example 2 | 0.9 | 5 | 260 | 0.003 |
| Example 3 | 0.9 | 4 | 270 | 0.002 |
| Example 4 | 0.9 | 4 | 280 | 0.005 |
| Comparative Example 1 | 0.9 | 5 | 440 | 0.005 |

The capacitors from Examples 2 to 4 have a much lower ESR than the capacitors of the comparative example. The polymeric intermediate layer produced in accordance with the invention significantly reduces the ESR in solid electrolytic capacitors.

Example 5

Production of Capacitors Using the Method According to the Invention 5.1. Production of Oxidised Electrode Bodies:

Tantalum powder having a specific capacitance of 50,000 µFV/g was compressed and sintered into pellets with the inclusion of a tantalum wire in order to form an electrode body having the dimensions 0.8 mm*0.8 mm*1 mm Nine of these porous electrode bodies were anodised to 30 V in a phosphoric acid electrolyte to form a dielectric.

5.2 Production of the Solid Electrolyte 100 g of the dispersion B from Example 1 and 4 g of dimethyl sulphoxide (DMSO) were mixed intensively in a beaker glass with a stirrer and diluted with water to a solids content of 0.6% to form a dispersion B5.

The oxidised electrode bodies were steeped in this dispersion B5 for 1 min. Afterwards drying was carried out at 120° C. for 10 min. Steeping and drying were carried out 14 further times.

5.3 Production of the Polymeric Intermediate Layer According to the Invention

The oxidised electrode bodies were steeped in the dispersion B2 (Example 2.3) for 1 min. Afterwards drying was carried out at 120° C. for 10 min Steeping and drying were carried out four further times.

5.4 Production of a Polymeric Outer Layer

The capacitor bodies were steeped in the dispersion C from Example 1 and subsequently dried for 10 min at 120° C.

Finally, the electrode bodies were covered with a graphite and silver layer.

The average electrical values of the nine capacitors produced in the foregoing manner are set out in Table 2. The capacitance (in microfarads) was determined at 120 Hz and the equivalent series resistance (ESR) (in milliohms) was determined at 100 kHz by means of an LCR meter (Agilent 4284A).

After measuring the electrical values, the capacitors were placed into a furnace heated to 300° C., removed again after 30 seconds (s) and cooled to room temperature. This process was repeated three further times and subsequently the ESR of the capacitors was remeasured. The values are also set out in Table 2.

Comparative Example 2

Production of Capacitors without a Polymeric Intermediate Layer

Nine capacitors were produced as in Example 5, although without applying a polymeric intermediate layer as under 5.3 in Example 5.

The average electrical values of the nine capacitors produced in the foregoing manner are set out in Table 2.

Comparative Example 3

Production of Capacitors with an Intermediate Layer not According to the Invention Nine capacitors were produced as in Example 5, although the material used to produce the polymeric intermediate layer was the dispersion B5 from 5.2 in Example 5, which comprises no binder.

The average electrical values of the nine capacitors produced in the foregoing manner are set out in Table 2.

Example 6

Production of Capacitors Using the Method According to the Invention 6.1. Production of Oxidised Electrode Bodies:

Nine oxidised electrode bodies were produced as under 5.1 from Example 5.

6.2 Production of the Solid Electrolyte

A solution was produced consisting of one part by weight of 3,4-ethylenedioxythiophene (BAYTRON® M, H.C. Starck GmbH) and 20 parts by weight of a 40% by weight ethanolic solution of iron (III)-p-toluenesulphonate (BAYTRON® C-E, H.C. Starck GmbH).

The solution was used to impregnate the oxidised electrode bodies. The electrode bodies were steeped in this solution and subsequently dried for 30 min at room temperature (20° C.). Afterwards they were heat-treated in a drying cabinet for 30 min at 50° C. Subsequently, the electrode bodies were washed in a 2% by weight aqueous solution of p-toluic acid for 60 min. The electrode bodies were reformed in a 0.25% by weight aqueous solution of p-toluene sulphonic acid for 30 min, subsequently rinsed in distilled water and dried. The described steeping, drying, heat treatment and reforming were carried out two further times using the same electrode bodies.

6.3 Production of the Polymeric Intermediate Layer According to the Invention

A polymeric intermediate layer was applied as under 5.3 from Example 5.

6.4 Production of a Polymeric Outer Layer

A polymeric outer layer was applied as under 5.4 from Example 5. Finally, the electrode bodies were covered with a graphite and silver layer.

The average electrical values of the nine capacitors produced in the foregoing manner are set out in Table 2.

Comparative Example 4

Production of Capacitors without a Polymeric Intermediate Layer

Nine capacitors were produced as in Example 6, but without a polymeric intermediate layer from 6.3.

The average electrical values of the nine capacitors produced in the foregoing manner are set out in Table 2.

TABLE 2

| | Capacitance [µF] | ESR [mΩ] before heat treatment | ESR [mΩ] after heat treatment |
|---|---|---|---|
| Example 5 | 5 | 250 | 260 |
| Example 6 | 5 | 260 | 270 |
| Comparative Example 2 | 5 | 670 | 800 |
| Comparative Example 3 | 5 | 620 | 780 |
| Comparative Example 4 | 5 | 390 | 490 |

The capacitors from Examples 5 to 6 have a much lower ESR than the capacitors of Comparative Examples 2 to 3. The polymeric intermediate layer produced in accordance with the invention significantly reduces the ESR in solid electrolytic capacitors. In addition, the ESR of the capacitors from Examples 5 to 6 hardly increases under thermal loading, whereas a marked rise may be noted in the comparative examples.

Example 7

Production of Capacitors Using the Method According to the Invention 7.1. Production of Oxidised Electrode Bodies:

Tantalum powder having a specific capacitance of 100,000 µFV/g was compressed and sintered into pellets with the inclusion of a tantalum wire in order to form an electrode body having the dimensions 1.1 mm*1.1 mm*2.2 mm Nine of these porous electrode bodies were anodised to 30 V in a phosphoric acid electrolyte to form a dielectric.

7.2 Production of the Solid Electrolyte

The oxidised electrode bodies were steeped in the dispersion B5 from Example 5 for 1 min. Afterwards drying was carried out at 120° C. for 10 min. Steeping and drying were carried out 14 further times.

7.3 Production of the Polymeric Intermediate Layer According to the Invention

The oxidised electrode bodies were steeped in the dispersion B2 (Example 2.3) for 1 min. Afterwards drying was carried out at 120° C. for 10 min. Steeping and drying were carried out four further times.

7.4 Production of a Polymeric Outer Layer

The capacitor bodies were steeped in the dispersion C from Example 1 and subsequently dried for 10 min at 120° C. Finally, the electrode bodies were covered with a graphite and silver layer.

The average electrical values of the nine capacitors produced in the foregoing manner are set out in Table 3. The capacitance (in microfarads) was determined at 120 Hz and the equivalent series resistance (ESR) (in milliohms) was determined at 100 kHz by means of an LCR meter (Agilent 4284A).

Comparative Example 5

Production of Capacitors without a Polymeric Intermediate Layer

Nine capacitors were produced as in Example 7, although without applying a polymeric intermediate layer as under 7.3 in Example 7.

The average electrical values of the nine capacitors produced in the foregoing manner are set out in Table 3.

TABLE 3

| | Capacitance [μF] | ESR [mΩ] |
|---|---|---|
| Example 7 | 45 | 120 |
| Comparative Example 5 | 45 | 160 |

The capacitors from Example 7 have a much lower ESR than the capacitors of Comparative Example 5. The polymeric intermediate layer produced in accordance with the invention significantly reduces the ESR in solid electrolytic capacitors. The reduction of the ESR is less marked than in the somewhat smaller capacitors from Examples 2 to 6.

Example 8

Production of Capacitors Using the Method According to the Invention 8.1. Production of Oxidised Electrode Bodies:

Tantalum powder having a specific capacitance of 100,000 μFV/g was compressed and sintered into pellets with the inclusion of a tantalum wire in order to form an electrode body having the dimensions 0.8 mm*0.8 mm*1 mm Nine of these porous electrode bodies were anodised to 30 V in a phosphoric acid electrolyte to form a dielectric.

8.2 Production of the Solid Electrolyte 100 g of the dispersion B from Example 1 and 4 g of dimethyl sulphoxide (DMSO) were mixed intensively in a beaker glass with a stirrer and diluted with water to a solids content of 0.6% to form a dispersion B5. The specific conductivity of this dispersion was 430 S/cm.

The oxidised electrode bodies were steeped in this dispersion B5 for 1 min. Afterwards drying was carried out at 120° C. for 10 min. Steeping and drying were carried out 14 further times.

8.3 Production of the Polymeric Intermediate Layer According to the Invention 100 g of the dispersion B (from Example 1), 3 g of a sulphopolyester (Eastek 1100, solids content 30% in water) and 4 g of dimethyl sulphoxide (DMSO) were mixed intensively in a beaker glass with a stirrer to form a dispersion B2.

The oxidised electrode bodies were steeped in this dispersion B2 for 1 min. Afterwards drying was carried out at 120° C. for 10 min. Steeping and drying were carried out four further times.

8.4 Production of a Polymeric Outer Layer

The capacitor bodies were steeped in the dispersion C from Example 1 and subsequently dried for 10 min at 120° C.

Finally, the electrode bodies were covered with a graphite and silver layer.

The average electrical values of the nine capacitors produced in the foregoing manner are set out in Table 4. The capacitance (in microfarads) was determined at 120 Hz and the equivalent series resistance (ESR) (in milliohms) was determined at 100 kHz by means of an LCR meter (Agilent 4284A).

Comparative Example 6

Production of Capacitors without a Polymeric Intermediate Layer

Nine capacitors were produced as in Example 8, although without applying a polymeric intermediate layer as under 8.3 in Example 8.

The average electrical values of the nine capacitors produced in the foregoing manner are set out in Table 4.

Comparative Example 7

Production of Capacitors Using a Method not According to the Invention by Means of a Dispersion Comprising No Binder Nine capacitors were produced as in Example 8, although the material used to produce the polymeric intermediate layer was the dispersion B5 from 8.2 in Example 8, which comprises no binder.

The average electrical values of the nine capacitors produced in the foregoing manner are set out in Table 4.

Comparative Example 8

Production of Capacitors Using a Method not According to the Invention by Means of a Dispersion Comprising Particles Having an Average Diameter of Greater than 60 nm and a Binder Nine capacitors were produced as in Example 8, although the following dispersion was used to produce the polymeric intermediate layer:

100 g of the dispersion A (from Example 1), 3 g of a sulphopolyester (Eastek 1100, solids content 30% in water) and 4 g of dimethyl sulphoxide (DMSO) were mixed intensively in a beaker glass with a stirrer to form a dispersion. The specific conductivity of this dispersion was 200 S/cm.

The average electrical values of the nine capacitors produced in the foregoing manner are set out in Table 4.

Comparative Example 9

Production of Capacitors Using a Method not According to the Invention by Means of a Dispersion Comprising Particles Having an Average Diameter of Greater than 60 nm and no Binder Nine capacitors were produced as in Example 8, although the following dispersion was used to produce the polymeric intermediate layer:

100 g of the dispersion A (from Example 1) and 4 g of dimethyl sulphoxide (DMSO) were mixed intensively in a beaker glass with a stirrer to form a dispersion. The specific conductivity of this dispersion was 430 S/cm.

The average electrical values of the nine capacitors produced in the foregoing manner are set out in Table 4.

TABLE 4

| | Capacitance [μF] | ESR [mΩ] |
|---|---|---|
| Example 8 | 12 | 130 |
| Comparative Example 6 | 12 | 240 |
| Comparative Example 7 | 12 | 220 |
| Comparative Example 8 | 12 | 280 |
| Comparative Example 9 | 12 | 220 |

The capacitors from Example 8 have a much lower ESR than the capacitors of Comparative Examples 6 to 9. The polymeric intermediate layer produced in accordance with the invention significantly reduces the ESR in solid electrolytic capacitors. Polymeric intermediate layers produced without binder lead, both with particles having an average size of 1-60 nm (Comparative Example 7) and with larger particles (Comparative Example 9), to a higher ESR, although the conductivity of this intermediate layer is much better. Polymeric intermediate layers produced with binders but made of particles having an average diameter of greater than 60 nm also lead to a higher ESR (Comparative Example 8).

Example 9

Production of Capacitors Using the Method According to the Invention 9.1. Production of Oxidised Electrode Bodies:

10 porous aluminium foils having a size of 4 mm*4 mm were anodised at 20 V.

9.2 Production of the Solid Electrolyte 100 g of the dispersion B (from Example 1), 4 g of dimethyl sulphoxide (DMSO) and 0.5 g of 3-glycidoxypropyltrimethoxysilane (Silquest A-187, OSi Specialties) were mixed intensively in a beaker glass with a stirrer to form a dispersion. Subsequently, the pH of this dispersion was set to a value of 6 by adding 2-dimethylaminoethanol.

The oxidised aluminium foils were steeped in this dispersion for 1 min. Afterwards drying was carried out at 120° C. for 10 min. Steeping and drying were carried out nine further times.

9.3 Production of the Polymeric Intermediate Layer According to the Invention 100 g of the dispersion B (from Example 1), 4 g of dimethyl sulphoxide (DMSO), 0.5 g of 3-glycidoxypropyltrimethoxysilane (Silquest A-187, OSi Specialties) and 3 g of a sulphopolyester (Eastek 1100, solids content 30% in water) were mixed intensively in a beaker glass with a stirrer to form a dispersion. Subsequently, the pH of this dispersion was set to a value of 6 by adding 2-dimethylaminoethanol.

The oxidised aluminium bodies were steeped in this dispersion for 1 min. Afterwards drying was carried out at 120° C. for 10 min. Steeping and drying were carried out a further time.

9.4 Production of a Polymeric Outer Layer

The capacitor bodies were steeped in the dispersion C from Example 1 and subsequently dried for 10 min at 120° C.

Finally, the electrode bodies were covered with a graphite and silver layer.

The average electrical values of the 10 capacitors produced in this manner are set out in Table 5. The capacitance (in microfarads) was determined at 120 Hz and the equivalent series resistance (ESR) (in milliohms) was determined at 100 kHz by means of an LCR meter (Agilent 4284A).

Comparative Example 10

Production of Capacitors without a Polymeric Intermediate Layer 10 capacitors were produced as in Example 9, although without applying a polymeric intermediate layer as under 9.3 in Example 9.

The average electrical values of the nine capacitors produced in the foregoing manner are set out in Table 5.

TABLE 5

|  | Capacitance [µF] | ESR [mΩ] |
|---|---|---|
| Example 9 | 14 | 17 |
| Comparative Example 10 | 14 | 25 |

The capacitors from Example 9 have a much lower ESR than the capacitors of Comparative Example 10. The polymeric intermediate layer produced in accordance with the invention significantly reduces the ESR in solid electrolytic capacitors.

The invention claimed is:

1. A method of producing an electrolytic capacitor, the method comprising:

(i) providing a capacitor body comprising a porous electrode, a dielectric disposed on a surface of the porous electrode, and a solid electrolyte comprising an electrically conductive material covering at least a portion of the dielectric;

(ii) applying a first dispersion (a1) comprising at least particles (b1) of an electrically conductive polymer having an average diameter of 1-60 nm, a binder (c1) and a dispersing agent (d1) to the capacitor body, and at least partially removing the dispersing agent (d1) to form an electrically conductive polymeric intermediate layer on the capacitor body, wherein the solids content of the polymeric binder (c1) in dispersion (a1) is 0.5 to 30% by weight; and (iii) applying a second dispersion (a2) comprising at least particles (b2) of an electrically conductive polymer having an average diameter of 100-600 nm, a binder (c2), and a dispersing agent (d2), and at least partially removing the dispersing agent (d2), curing the binder (c2) or both, to form an electrically conductive polymeric outer layer;

wherein the particles of the electrically conductive polymer in the first and the second dispersion comprise a polythiophene/polyanion complex.

2. The method according to claim 1, wherein one or both of the electrically conductive polymeric intermediate layer and the electrically conductive polymeric outer layer has a specific electrical conductivity of greater than 10 S/cm.

3. The method according to claim 1, wherein one or both of the dispersion (a1) and the dispersion (a2) has a metals content of less than 5,000 mg/kg.

4. The method according to claim 1, wherein one or both of the binder (c1) and the binder (c2) each independently comprises a polymeric organic binder.

5. The method according to claim 1, wherein one or both of the dispersing agent (d1) and the dispersing agent (d2) each independently comprises a component selected from the group consisting of organic solvents, water and mixtures thereof.

6. The method according to claim 1, wherein one or both of the electrically conductive polymer of particles (b1) and the electrically conductive polymer of the particles (b2) each independently comprises at least one polythiophene having one or more repeating units selected from the group consisting of general formula (I), general formula (II), general formula (X) and combinations thereof, wherein each A independently represents an optionally substituted $C_1$-$C_5$ alkylene radical, each R independently represents an H, a linear or branched, optionally substituted $C_1$-$C_{18}$ alkyl radical, an optionally substituted $C_5$-$C_{12}$ cycloalkyl radical, an optionally substituted $C_6$-$C_{14}$ aryl radical, an optionally substituted $C_7$-$C_{18}$ aralkyl radical, an optionally substituted $C_1$-$C_4$ hydroxyalkyl radical or a hydroxyl radical, and x represents an integer from 0 to 8.

7. The method according to claim 1, wherein one or both of the electrically conductive polymer of particles (b1) and the electrically conductive polymer of the particles (b2) each independently comprises an optionally substituted poly(3,4-ethylenedioxythiophene).

8. The method according to claim 1, wherein one or both of the dispersion (a1) and the dispersion (a2) each independently further comprises at least one polymeric anion selected from the group consisting of anions of polymeric carboxylic or sulphonic acids.

9. The method according to claim 1, wherein one or both of the dispersion (a1) and the dispersion (a2) each independently further comprises a crosslinking agent(s) and/or a surface-active substance(s) and/or a further additive(s).

10. The method according to claim 1, wherein one or both of applying the dispersion (a1) and applying the dispersion (a2) is repeated one or more times.

11. The method according to claim 1, wherein the solid electrolyte comprises a conductive polymer.

12. A method of producing an electrolytic capacitor, the method comprising:
(i) providing a capacitor body comprising a porous electrode, a dielectric disposed on a surface of the porous electrode, and a solid electrolyte comprising an electrically conductive material covering at least a portion of the dielectric;
(ii) applying a first dispersion (a1) comprising at least particles (b1) of an electrically conductive polymer having an average diameter of 1-60 nm, a binder (c1) and a dispersing agent (d1) to the capacitor body, and at least partially removing the dispersing agent (d1) to form an electrically conductive polymeric intermediate layer on the capacitor body, wheren the solids content of the polymeric binder (c1) in dispersion (a1) is 0.5 to 30% by weight; and
(iii) applying a second dispersion (a2) comprising at least particles (b2) of an electrically conductive polymer having an average diameter of 100-600 nm, a binder (c2), and a dispersing agent (d2), and at least partially removing the dispersing agent (d2), curing the binder (c2) or both, to form an electrically conductive polymeric outer layer;
wherein the particles of the electrically conductive polymer in the first and the second dispersion comprise a polythiophene/polyanion complex,
wherein the solid electrolyte comprises a poly(3,4-ethylenedioxythiophene)/polystyrene sulphonic acid.

13. The method according to claim 1, wherein the porous electrode comprises a valve metal or a compound having the electrical properties of a valve metal.

14. An electrolytic capacitor produced by the method according to claim 1.

15. An electronic circuit comprising an electrolytic capacitor according to claim 14.

* * * * *